U S006837520B2

(12) United States Patent
Singer

(10) Patent No.: US 6,837,520 B2
(45) Date of Patent: Jan. 4, 2005

(54) FASTENING ASSEMBLY FOR A SAFETY BELT REACTOR COMPRISING A REINFORCEMENT PLATE

(75) Inventor: Klaus-Peter Singer, Hamburg (DE)

(73) Assignee: Autoliv Development AB (SE)

( * ) Notice: Subject to any disclaimer, the term of this patent is extended or adjusted under 35 U.S.C. 154(b) by 33 days.

(21) Appl. No.: 10/258,197

(22) PCT Filed: Mar. 31, 2001

(86) PCT No.: PCT/EP01/03690

§ 371 (c)(1),
(2), (4) Date: Oct. 18, 2002

(87) PCT Pub. No.: WO01/81130

PCT Pub. Date: Nov. 1, 2001

(65) Prior Publication Data

US 2003/0137141 A1 Jul. 24, 2003

(30) Foreign Application Priority Data

Apr. 19, 2000 (DE) ........................................ 100 19 276

(51) Int. Cl.[7] .............................................. B60R 22/34
(52) U.S. Cl. ....................................... 280/807; 242/379
(58) Field of Search .......................... 280/801.1, 801.2, 280/807; 242/379, 379.1, 379.2, 398, 406

(56) References Cited

U.S. PATENT DOCUMENTS 3,456,896 A * 7/1969 Fisher ..................... 242/379.2
4,149,737 A * 4/1979 Magyar ....................... 280/807
4,721,269 A * 1/1988 Gulette et al. ............ 242/385.2
5,129,680 A * 7/1992 Mori ........................... 280/806
5,211,694 A * 5/1993 Sakakida et al. ........... 280/806
5,678,782 A * 10/1997 Osumi ..................... 242/381.1
6,354,529 B1 * 3/2002 Asagiri et al. ............... 242/379

FOREIGN PATENT DOCUMENTS

| DE | 30 02 900 | 7/1980 | |
| DE | 197 14 381 | 4/1998 | |
| DE | 197 52 191 | 7/1998 | |
| EP | 715997 A1 * | 6/1996 | ........... B60R/22/28 |
| GB | 2020963 A * | 11/1979 | ........... A62B/35/02 |
| JP | 63222958 A * | 9/1988 | ........... B60R/22/34 |
| JP | 09-240426 | 9/1997 | |

* cited by examiner

Primary Examiner—Paul N. Dickson
Assistant Examiner—Laura B. Rosenberg
(74) Attorney, Agent, or Firm—Robert W. Becker and Associates; Robert W. Becker

(57) ABSTRACT

The invention relates to an assembly for fastening a belt retractor to the body part of a motor vehicle. Said assembly comprises a mounting plate, which is involved in the fastening of the belt retractor, and which is provided as a separate reinforcement plate (13) with a continuous opening (14) for a fastening means. The reinforcement plate (13) comprises a slot-like opening (25) for placing it on the fastening bracket (12) of the belt retractor (10) such that the fastening bracket (12), when mounting the belt retractor (10) on the body part (26), rests between the reinforcement plate (13) and the body part (26), and the continuous openings (14) of the fastening bracket (12) and reinforcement plate (13) are aligned with one another.

9 Claims, 4 Drawing Sheets

FASTENING ASSEMBLY FOR A SAFETY BELT REACTOR COMPRISING A REINFORCEMENT PLATE

BACKGROUND OF THE INVENTION

The invention relates to an arrangement for securing a belt retractor on the body part of a motor vehicle, whereby the housing of the belt retractor, which is U-shaped and has side shanks and supports therein a belt shaft, comprises a fastening bracket projecting therefrom having an access opening for a securement means operable to secure the belt retractor to the body part of the motor vehicle and an additional mounting plate deployed for the securement of the belt retractor on the body part.

In connection with safety belt retractors, one generally endeavors, for the reasons of achieving material and weight savings and the cost reductions associated therewith, to configure the housing with a lighter weight and with thinner sheet metal thicknesses, whereby the disadvantage associated therewith is that the housing, in the area of its fastening bracket, does not exhibit a sufficient deformation resistance and, in contemplating a threaded securement of the housing, the reduced material thickness is not sufficient for the provision of a threaded fastener receiver which will operate in the capacity of a securement means. Assistance in this regard has been provided by the provision of additional welded nuts provided with threads, whereby this involves an additional manufacturing effort in the manufacturing of the housing. The disadvantage of the reduced deformation resistance force in connection with the fastening bracket comes especially to the fore if the draw-off location of the belt at which the belt is drawn off the belt shaft supported in the U-shaped housing is disposed opposite the fastening bracket, as this is the case, for example, in the area of the back-sided cap repository of belt retractors installed in motor vehicles. In this event, a moment is exerted upon the fastening bracket or, respectively, the securement means, upon the loading of the belt during a blocking action.

An arrangement having the state of the art features is disclosed, for example, in DE 197 52 191 A1. In this arrangement, there is provided, for the reason of facilitating the mounting of the arrangement, a mounting plate which is secured by tack welding before the mounting of the belt retractor to the body part; the mounting plate is provided with hook-shaped projections on which the housing of the belt retractor is to be suspended via engagement of the hook-shaped projections by correspondingly arranged longitudinal holes on the housing and, thereby, is to be maintained in a pre-positioned mounted disposition before subsequent securement onto the body part.

At the least, the mounting of the mounting plate on the body part disadvantageously represents an additional installation effort; moreover, the mounting plate is not in the position to permit a configuration of the housing walls or, respectively, the fastening bracket, to be of a thin material thickness or to permit the provision of a threaded fastener receiver for receipt of a securement nut, because the fastening bracket of the belt retractor lies outside the mounting plate.

SUMMARY OF THE INVENTION

The invention provides a solution to the challenge of providing a securement arrangement for a security belt retractor, which, in connection with the mounting of the security belt retractor in a motor vehicle, is easy to access and which makes possible a secure mounting as well as a configuration having a thin-walled housing with a sufficient force transmission capability.

The solution to this challenge is set forth in the advantageous configurations and further embodiments of the invention recited in the content of the patent claims which follow this description.

The invention provides, in its core concepts, that the mounting plate is configured as a separate reinforcement plate with an access opening for a securement means and that the reinforcement plate comprises a slot-type opening for the insertion of the fastening bracket of the belt retractor therethrough in such a manner that the fastening bracket, upon the mounting of the belt retractor on the body part, comes to rest between the reinforcement plate and the body part and with the access openings for the fastening bracket and the reinforcement plate in alignment with one another. The advantage is connected with the invention that the separate reinforcement plate is insertable through the fastening bracket so that a substantial additional mounting effort is not called for. Since the optionally thin-walled fastening bracket of the housing of the belt retractor comes to rest, upon mounting, between the reinforcement plate and the body part of the motor vehicle, a sufficient force transmission is present upon a loading of the housing of the security belt retractor. The reinforcement plate is configured, in accordance with an embodiment of the invention, with a material thickness such that the reinforcement plate has a jetted throughbore for the threads of a securement nut to be secured thereto.

In accordance with an embodiment of the invention, it is provided that the reinforcement plate has a region in which the access opening is formed and a region extending under the side shanks of the U-shaped housing. In connection with a tension loading thereof, the belt, in the configuration in which it is disposed on a side of the housing opposite to that of the fastening bracket, exerts a tipping moment on the housing which is advantageously opposed by the reinforcement plate, in that the reinforcement plate presses the fastening bracket of the housing downwardly and, thereby, resists a lifting of the fastening bracket away from the body part of the motor vehicle. In an advantageous embodiment of the invention, it can be additionally provided that the reinforcement plate, in the region thereof extended into an under gripping relationship with the side shanks, comprises receipt openings for the receipt therein of projections projecting from the side shanks of the housing. In this manner, via the gripping engagement of the projections extending in the plane of the side shanks into the receipt openings of the reinforcement plate, there can advantageously be realized a stabilization and a spaced relationship maintaining capacity for the side shanks as well as the possibility for absorbing displacement forces in the plane of the body part.

To the extent that the respective body part of the vehicle acting as the securement location of the safety belt retractor has a planar configuration, it can be provided, in accordance with an embodiment of the invention, that the reinforcement plate as well is configured as a planar component and is mounted on the respective body part of the vehicle.

To the extent that the respective body part onto which the safety belt retractor is secured is frequently provided in the region of the B-column of a vehicle or a vehicle seat with crimped bent out regions, in order to create room for the mounting of the securement means, it is provided, in one embodiment of the invention, that the reinforcement plate has a bent shape in its access opening forming region and a bent out shape in its housing side shank under gripping region. Via the configuration of the securement means with the required bending, it is advantageously made possible that the reinforcement plate, which is produced as a standard component in planar form, can be compatibly configured with the respective structure of the body part by simple bending thereof.

BRIEF DESCRIPTION OF THE DRAWINGS

An embodiment of the invention is shown further in the drawings, which are hereinafter described. The drawings show.

DESCRIPTION OF THE PREFERRED EMBODIMENTS

Figure 1:
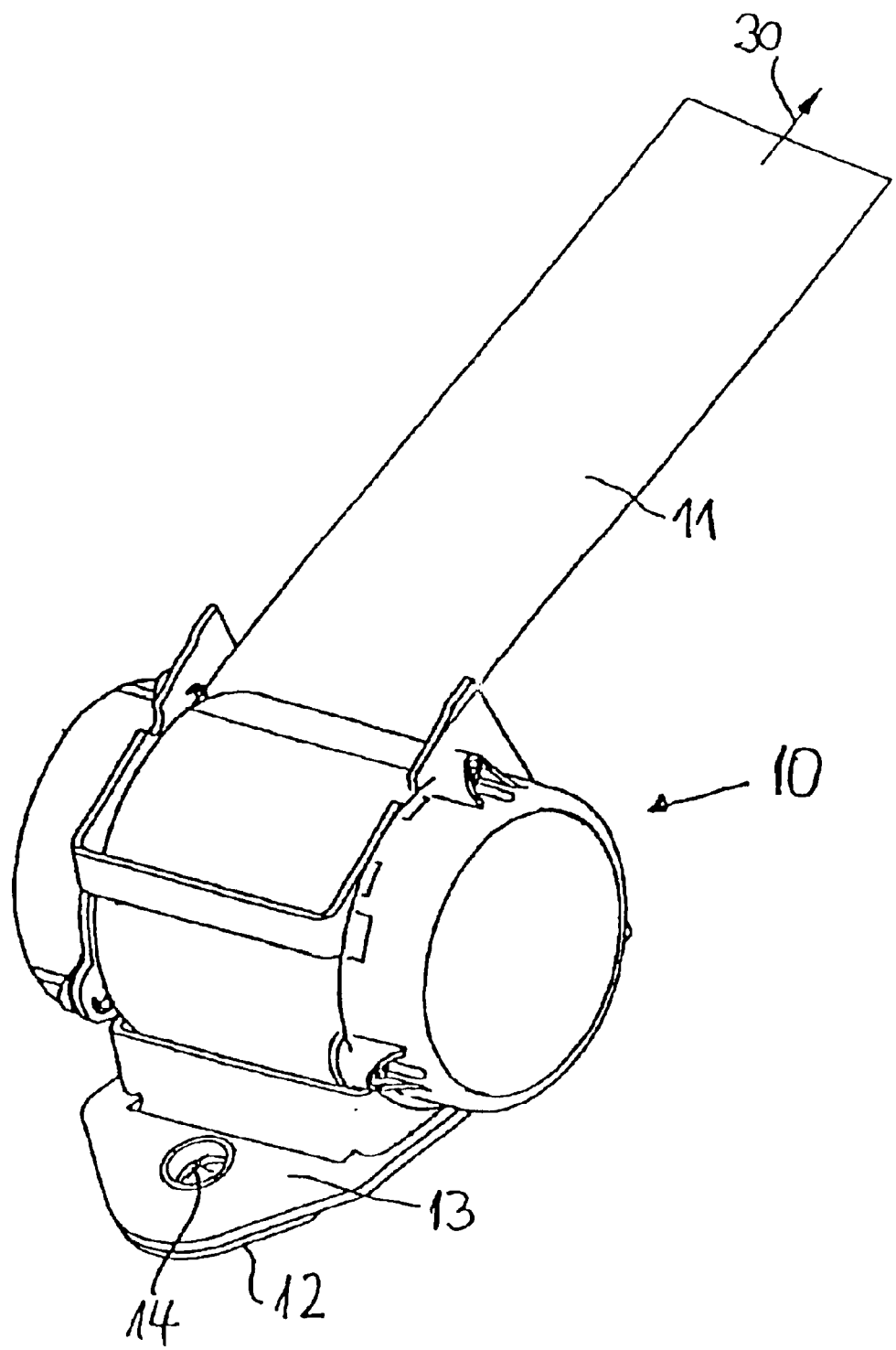
FIG. 1 a belt retractor with an inserted reinforcement plate.

As seen in FIG. 1, a belt retractor 10 is shown, the belt retractor having a belt 11 wound thereonto which can be withdrawn in the direction shown by the arrow 30 from the belt shaft which supports the belt. The housing of the belt retractor 10 comprises an outwardly extending fastening bracket 12 with an access opening 14 for receipt therethrough of a securement means for the securement of the belt retractor 10 onto a body part of the motor vehicle. In this connection, in this embodiment, the belt retractor 10 is a so-called "left rotating" belt, by which the belt 11, in correspondence with the requirements of the installer, is unwound, from a side of the housing opposite to the side of the housing at which the fastening bracket 12 is disposed, in a direction opposite to the direction toward the fastening bracket 12. An additional reinforcement plate 13 is deployed in connection with the mounting of the belt retractor 10.

Figure 2A:
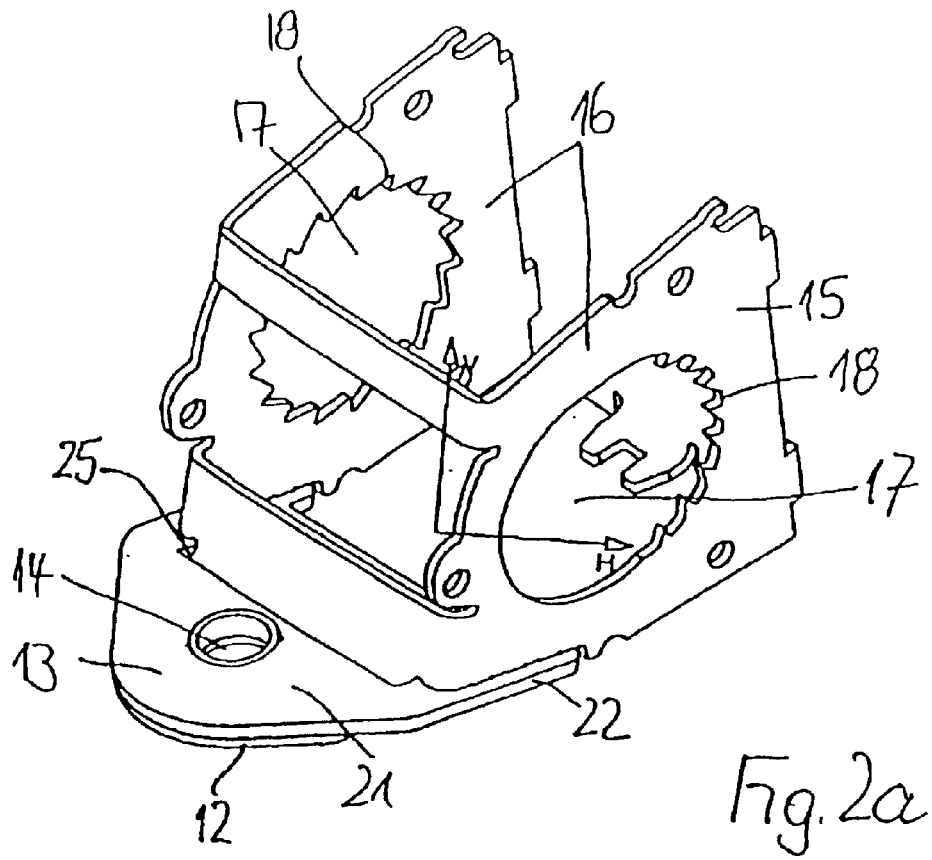
FIGS. 2a, b various views of the housing of the belt retractor with the inserted reinforcement plate shown in FIG. 1, FIG. 3 respective separate top plan views of the belt retractor housing and the reinforcement plate, FIG. 4 a side view of a belt retractor secured to the body part of a vehicle by means of the reinforcement plate, FIG. 4a an individual view of a feature of the reinforcement plate shown in FIG. 4, FIG. 5 a view of another embodiment of the subject matter of FIG. 4, FIG. 5a an individual view of a feature of the reinforcement plate shown in FIG. 5.
Figure 2B:
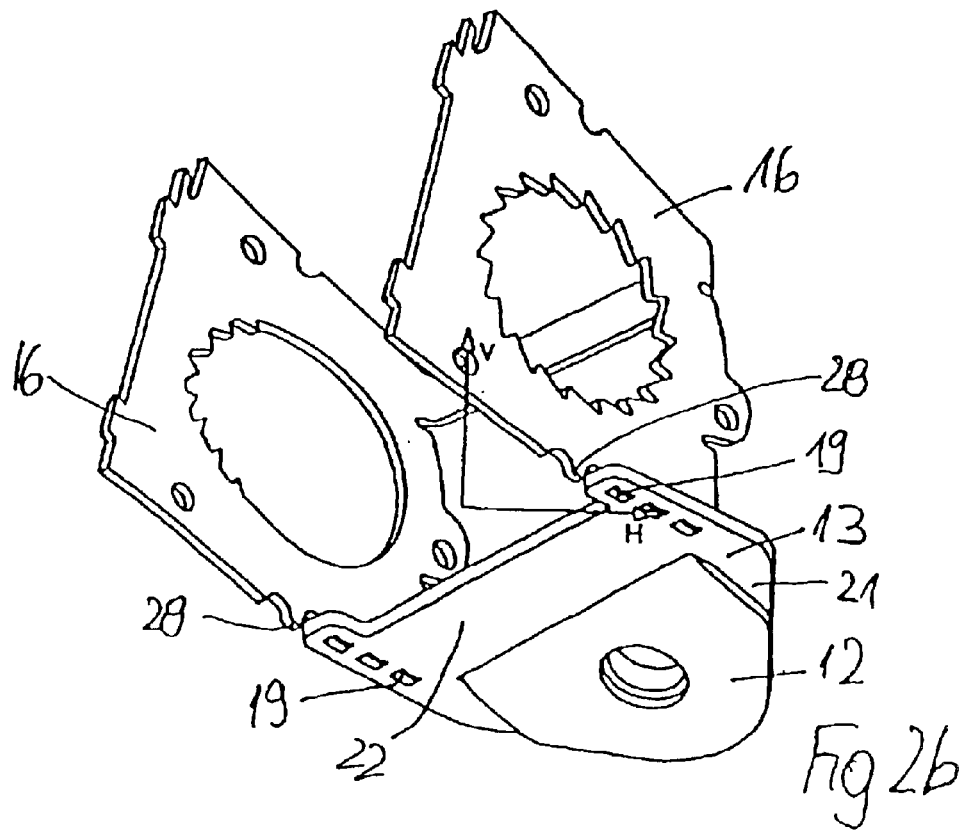
Figure 3:
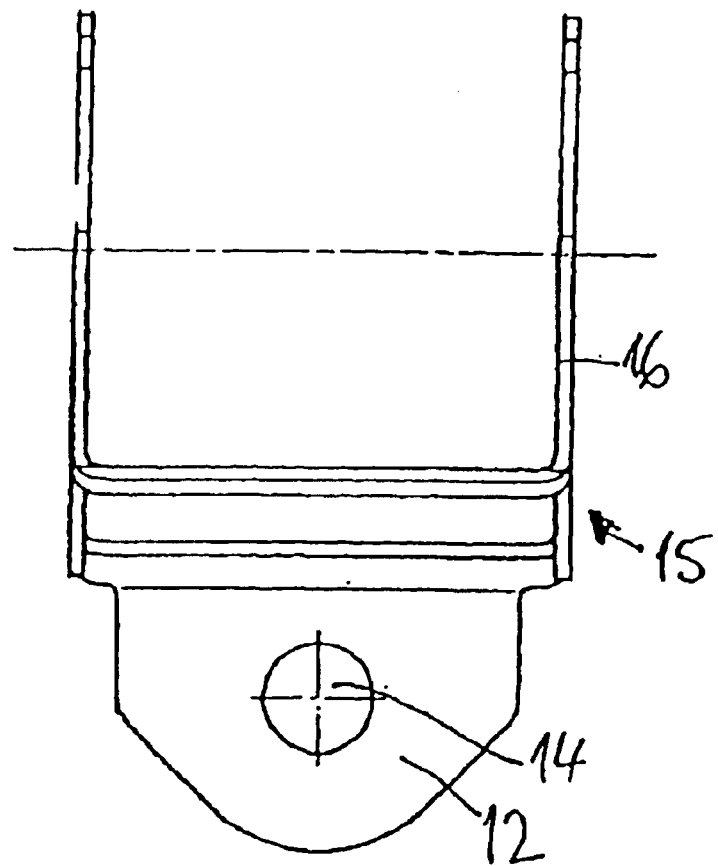
Figure 3:
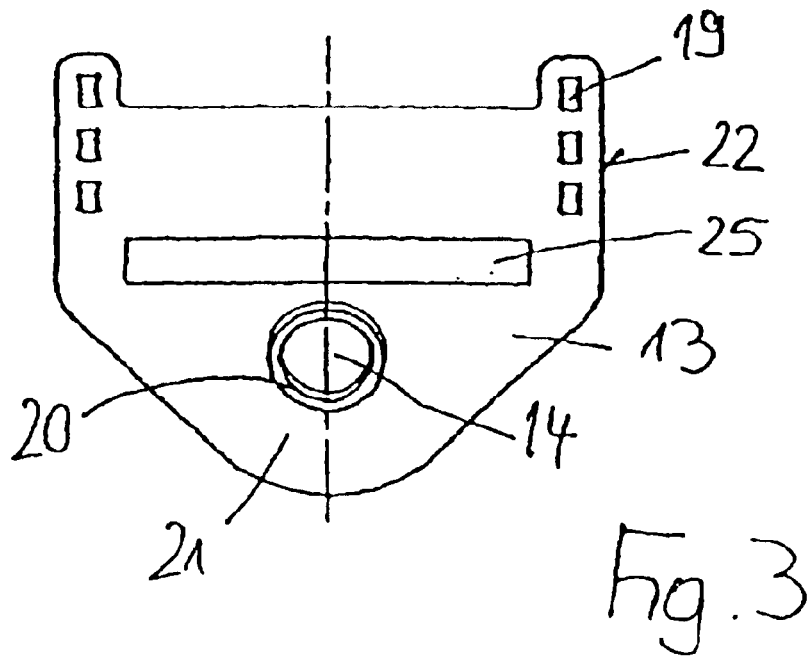

As can be seen in more detail in FIGS. 2a and 2b, the housing 15 of the belt retractor is configured with side shanks 16, in which receipt openings 17 are provided for mounting a non-illustrated belt shaft in the housing; the receipt openings 17 are, in various configurations, provided with a ratchet tooth assembly 18 for the blocking mechanism of the belt retractor. As can be seen when viewing FIGS. 2a, 2b together, the reinforcement plate 13 comprises a slot-type opening 25 through which the fastening bracket 12 of the housing 15 of the belt retractor is insertable in such a manner that the fastening bracket 12, as seen in the mounted disposition of the belt retractor shown in FIGS. 4 and 5, comes to rest between the reinforcement plate 13 and the body part of the vehicle; in this manner, there occurs an alignment of the access openings 14 respectively provided in the fastening bracket 12 and in the reinforcement plate 13 permitting the insertion therethrough of a securement means.

The reinforcement plate 13 comprises a region 21 in which is formed the access opening 14 with the slot-type opening 25, and the reinforcement plate extends, along a further region 22, under the side shanks 16 of the housing 15 and under grips these side shanks thereat. In this region 22, the reinforcement plate 13 is provided with receipt openings 19 in which are received, upon mounting of the housing 15, projections 28 extending from the planes of the side shanks 16 so that the side shanks 16 are fixedly secured via the portions thereof having projections 28 extending through the reinforcement plate 13 and are thereby maintained at a spacing from the reinforcement plate. There is collectively provided in this manner a reinforcement of the housing 15. The material thickness of the reinforcement plate 13 is selected such that the provision of a jetted or nozzle throughbore 20 for a threaded fastener receiver is possible.

Figure 4:
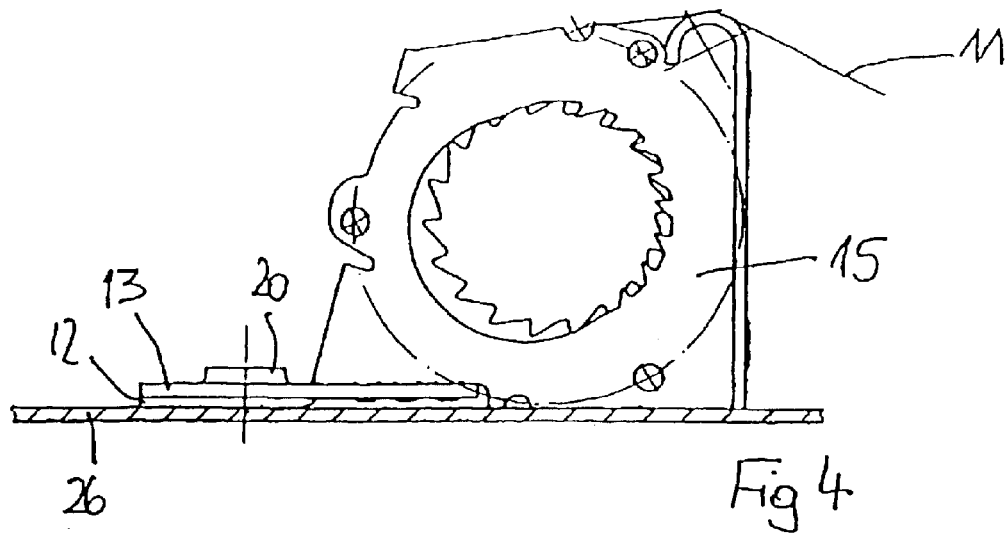
Figure 4A:
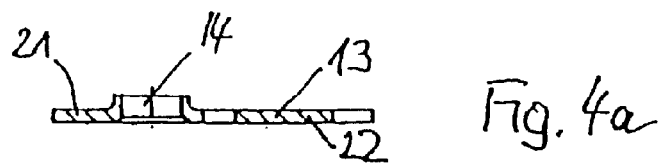

In the embodiment shown in FIGS. 4, 4a, the housing 15 of the belt retractor is secured on a planar body part 26 of the motor vehicle, whereby the reinforcement plate is configured as a planar component.

Figure 5:
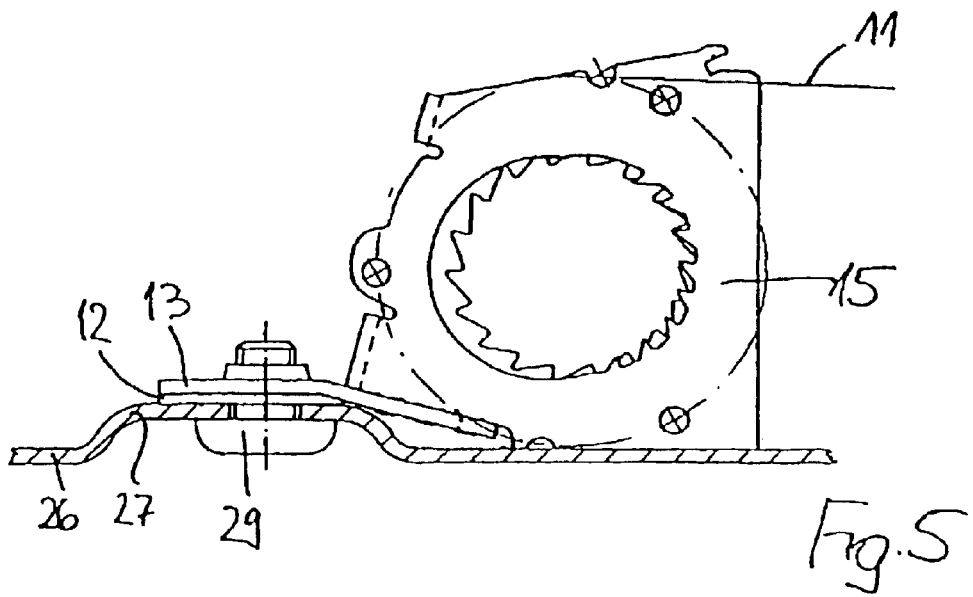
Figure 5A:
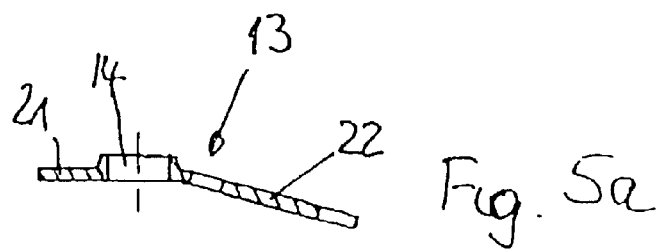

To the extent that the body part 26 comprises a crimped bent out portion 27 for creating a receiving space for a securement means 29, it is easily possible, in connection with the reinforcement plate 13 shown in FIG. 4a, to compatibly configure the reinforcement plate to correspond to the shape and height of the crimped bent out portion 27 of the body part 26 by bending the reinforcement plate along its region 22 which under grips the side shanks 16 of the housing, in the manner as shown in FIG. 5 or, respectively, in FIG. 5a.

The features of the subject matter of this arrangement, as disclosed in the foregoing description, the patent claims, the summary, and the drawings, can be of significance both individually as well as in preferred combinations with one another in the realization of the invention in its various embodiments.

The specification incorporates by reference the disclosure of German priority document 100 19 276.9 filed 19 Apr. 2000 and International priority document PCT/EP01/03690 filed 31 Mar. 2001.

The present invention is, of course, in no way restricted to the specific disclosure of the specification and drawings, but also encompasses any modifications within the scope of the appended claims.

What is claimed is:

1. An arrangement for securing a belt retractor on a body part of a motor vehicle, comprising:

a generally U-shaped housing, the housing supporting therein a belt shaft on which a belt is wound and from which the belt can be unwound, the housing having side shanks and a fastening bracket projecting outwardly from the housing, the fastening bracket having an access opening formed therein for receipt therethrough of a securement means operable to secure the belt retractor to the body part of the motor vehicle; and an additional mounting plate in the form of a reinforcement plate cooperating with the fastening bracket of the housing in the securement of the belt retractor on the body part, the reinforcement plate being a discrete component separate from the body part of the motor vehicle whose securement to the body part of the motor vehicle is effected solely via the operation of the securement means and the reinforcement plate having an access opening for the receipt therethrough of the respective securement means to be received through the access opening of the fastening bracket and the reinforcement plate having a slot-shaped opening through which the fastening bracket of the housing of the belt retractor is insertable in a manner such that the fastening bracket is intermediate the reinforcement plate and the body part of the motor vehicle upon mounting of the belt retractor on the body part of the motor vehicle and the access openings in the fastening bracket and the reinforcement plate are aligned with one another, whereupon cinching of the securement means extending serially through the reinforcement plate, the fastening bracket of the housing, and thereafter into the body part of the motor vehicle effects compressive securement of the fastening bracket between the reinforcement plate and the body part of the motor vehicle by reason of the intermediate position of the fastening bracket of the housing between the reinforcement plate and the body part of the motor vehicle.

2. An arrangement for securing a belt retractor on the body part of a motor vehicle according to claim 1, wherein the reinforcement plate has a region in which its access opening is formed and a region extending under the side shanks of the U-shaped housing.

3. An arrangement for securing a belt retractor on the body, part of a motor vehicle according to claim 2, wherein the reinforcement plate, in the region thereof extending under the side shanks of the U-shaped housing, has receipt openings for receiving therein projections projecting from the side shanks of the housing.

4. An arrangement for securing a belt retractor on the body part of a motor vehicle according to claim 2, wherein the reinforcement plate has a bent shape in its region having its access opening and a bent shape in its region extending under the side shanks of the U-shaped housing.

5. An arrangement for securing a belt retractor on the body part of a motor vehicle according to claim 1, wherein the reinforcement plate is configured with a nozzle opening for the receipt therein of a threaded fastener receiver of the securement means.

6. An arrangement for securing a belt retractor on the body part of a motor vehicle according to claim 1, wherein the reinforcement plate is configured as a planar component.

7. An arrangement for securing a belt retractor on a body part of a motor vehicle, comprising:

a generally U-shaped housing, the housing supporting therein a belt shaft on which a belt is wound and from which the belt can be unwound, the housing having side shanks and a fastening bracket projecting outwardly from the housing, the fastening bracket having an access opening formed therein for receipt therethrough of a tie-together securement means operable to secure the belt retractor to the body part of the motor vehicle; and a reinforcement plate cooperating with the fastening bracket of the housing in the securement of the belt retractor on the body part of the motor vehicle, the reinforcement plate having an access opening forming region that forms an access opening for the receipt therethrough of the tie-together securement means, a brace region spaced from the access opening forming region, and a pass through opening between the access opening forming region and the brace region, the housing extending through the pass through opening of the reinforcement plate with the fastening bracket of the housing being disposed to one side of the pass through opening of the reinforcement plate and another portion of the housing spaced from the fastening bracket being disposed to the other side of the pass through opening of the reinforcement plate and the access opening in the fastening bracket being aligned with the access opening of the reinforcement plate such that, upon mounting of the belt retractor on the body part of the motor vehicle, the tie-together securement means extends serially through the access opening of the reinforcement plate, then through the access opening of the fastening bracket of the housing, and thereafter into contact with the body part of the motor vehicle.

8. An arrangement for securing a belt retractor on the body part of a motor vehicle according to claim 7, wherein the pass through opening of the reinforcement plate between the access opening forming region and the brace region thereof is a slot.

9. An arrangement for securing a belt retractor on the body part of a motor vehicle according to claim 7, wherein the side shanks of the housing are secured to the brace region of the reinforcement plate.

* * * * *